(12) United States Patent
Greene et al.

(10) Patent No.: US 9,337,875 B2
(45) Date of Patent: May 10, 2016

(54) METHOD AND APPARATUS FOR REDUCING CHARGE AND DISCHARGE TIME OF CAPACITIVE ELEMENTS

(71) Applicant: BlackBerry Limited, Waterloo (CA)

(72) Inventors: Matthew Russell Greene, Crystal Lake, IL (US); James Oakes, Nashua, NH (US); Guillaume Blin, Carlisle, MA (US)

(73) Assignee: BLACKBERRY LIMITED, Waterloo, Ontario (CA)

( * ) Notice: Subject to any disclaimer, the term of this patent is extended or adjusted under 35 U.S.C. 154(b) by 44 days.

(21) Appl. No.: 14/022,765

(22) Filed: Sep. 10, 2013

(65) Prior Publication Data

US 2014/0364069 A1   Dec. 11, 2014

Related U.S. Application Data

(60) Provisional application No. 61/831,575, filed on Jun. 5, 2013.

(51) Int. Cl.
 *H04B 1/00* (2006.01)
 *H04B 1/04* (2006.01)

(52) U.S. Cl.
 CPC .................. *H04B 1/0458* (2013.01)

(58) Field of Classification Search
 CPC .................. H03J 3/10; H03J 3/20; H03J 3/28
 USPC ........................ 455/107, 248.1, 320
 See application file for complete search history.

(56) References Cited

U.S. PATENT DOCUMENTS

| | | | |
|---|---|---|---|
| 8,830,776 B1* | 9/2014 | Choy et al. ............... | 365/218 |
| 2005/0173542 A1* | 8/2005 | Watanabe et al. .......... | 235/492 |
| 2006/0176777 A1* | 8/2006 | Ihara ........................... | 368/47 |
| 2007/0091006 A1* | 4/2007 | Thober et al. ............... | 343/745 |
| 2009/0067208 A1* | 3/2009 | Martin et al. ............... | 363/126 |
| 2010/0099369 A1* | 4/2010 | Ozgun et al. ............... | 455/125 |
| 2010/0214024 A1* | 8/2010 | Jones ................... | H03F 1/0205 330/310 |
| 2012/0051409 A1* | 3/2012 | Brobston et al. ............ | 375/222 |
| 2012/0105147 A1* | 5/2012 | Harris et al. ............... | 330/57 |
| 2013/0069608 A1* | 3/2013 | Gakhar et al. .............. | 323/273 |
| 2013/0320960 A1* | 12/2013 | Fosas et al. ................ | 324/120 |

* cited by examiner

*Primary Examiner* — Wen Huang
(74) *Attorney, Agent, or Firm* — Guntin & Gust, PLC; Ralph Trementozzi

(57) ABSTRACT

A system that incorporates teachings of the subject disclosure may include, for example, emulating a behavior of an RF capacitive device utilizing a mirror circuit; and providing feedback signals to an input of an operational amplifier via a feedback node coupled with the mirror circuit. Other embodiments are disclosed.

20 Claims, 15 Drawing Sheets

100

200

300

900

1000

METHOD AND APPARATUS FOR REDUCING CHARGE AND DISCHARGE TIME OF CAPACITIVE ELEMENTS

CROSS REFERENCE TO RELATED APPLICATIONS

This application claims priority to U.S. Provisional Application Ser. No. 61/831,575 filed on Jun. 5, 2013, the disclosure of which is hereby incorporated by reference in its entirety. This application claims priority to Canadian Patent Application Serial No. 2,820,441 filed on Jun. 19, 2013, the disclosure of which is hereby incorporated by reference in its entirety.

FIELD OF THE DISCLOSURE

The subject disclosure relates to a method and apparatus for reducing charge and discharge time of capacitive elements.

BACKGROUND

Portable wireless devices, such as smart phones and tablets, have antennas incorporated into their industrial designs. These antennas can be multi-band, operating on multiple frequency bands such as in the range of 700 MHz to 2690 MHz. It is expected that many more frequency bands will be implemented in portable devices in order to ease the capacity congestion of the wireless cellular frequency bands Impedance matching over a large range of Radio Frequency (RF) bandwidth becomes increasingly more challenging as the number of supported bands increases.

Tunable components present a viable approach to antenna system design, which is ever more complex due to the growing list of operating frequencies and the increasing diversity and use cases of portable wireless devices. A primary application of such elements is in tunable matching networks, to compensate the power loss associated with the time-varying impedance mismatch in different operation modes of the device. In case of a wireless handheld device, the antenna impedance as seen by the transceiver varies when the user takes his device out of holster, sends a text message, watches a video, answers a phone call, and so on. A matching network can be tuned in an effort to reduce these impedance variations seen by the transceiver and hence improve the antenna performance.

Tunable components can be configured in various configurations utilizing various components, such as capacitive elements. Charging and discharging times of the capacitive elements can be directly related to performance of the tunable components.

BRIEF DESCRIPTION OF THE DRAWINGS

Reference will now be made to the accompanying drawings, which are not necessarily drawn to scale, and wherein.

DETAILED DESCRIPTION

Figure 1:
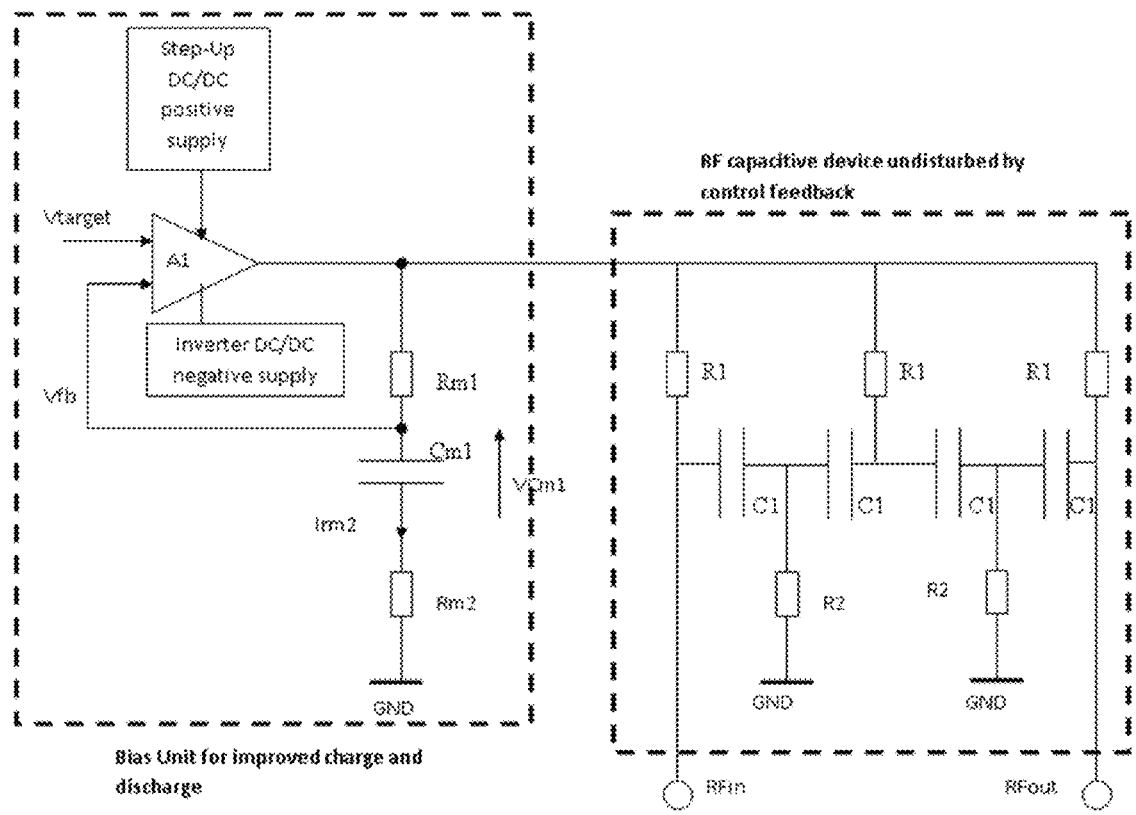
FIG. 1 depicts an illustrative embodiment of a portion of a communication device that includes a bias unit and an RF capacitive device.

The subject disclosure describes, among other things, illustrative embodiments for impedance matching for communication devices. The exemplary embodiments can enable faster charge and discharge time of capacitive loads in open loop and in closed loop systems. In one or more embodiments, an additional circuit can be used to achieve the same performance without affecting the original capacitive and bias network (particularly RF performance).

In one embodiment, a closed loop system can be provided in a communication device such as a capacitor mounted in series with a resistor and biased by an operational amplifier (although this can be extended to any kind of network containing passive or active elements). The sensed voltage used for feedback can be immediately through or across the capacitive load and not across the serial resistive elements and capacitive elements. The measured voltage is thus not artificially increased and the operational amplifier can keep applying a higher bias voltage, leading to a faster charge time (respectively lower voltage for discharge).

In another embodiment, a mirror circuit can be provided in the communication device where the mirror circuit emulates the behavior of a capacitive element or device (such as a matching network having a voltage tunable dielectric capacitor) within its network and where a feedback node is connected to the mirror circuit instead of the original section. The mirror circuit can be incorporated into the Bias unit IC to facilitate obtaining feedback information. In another embodiment, the mirror circuit can be used in conjunction with the above-described closed loop system (where the sensed voltage is immediately through the capacitive load and not across the serial resistive elements and capacitive elements), such that the benefit for charge/discharge is kept but there is no parasitic added to the original network.

In another embodiment, an increased positive voltage supply rather than nominal can be used for the operational amplifier, so that when used in conjunction with the closed loop system and/or mirror circuit described above, the charge time can be further reduced. In one embodiment, a step-up DC/DC converter can be utilized to internally generate a higher voltage supply or any other externally or internally generated voltage supply.

In another embodiment, a lower negative voltage supply rather than nominal can be used for the operational amplifier, so that when used in conjunction with the closed loop system and/or mirror circuit described above, the discharge time is further reduced. In one embodiment, an inverter DC/DC converter (for negative voltage generation) can be used to internally generate lower negative voltage supply or any other externally or internally generated voltage supply.

In one or more embodiments, an open loop control system can be implemented in a communication device where the charge and discharge time of a capacitive element can be reduced.

In one embodiment, a bias voltage higher than the desired voltage can be applied for a given duration to reduce the charge time. This duration can depend on a number of criteria including one or more of the desired final voltage, the capacitance vs. bias voltage response of the capacitive elements, the time constant of the circuit and the capacitance value.

In one embodiment, a bias voltage lower than the desired voltage can be applied for a given duration. This duration can be based on a number of criteria including one or more of the desired final voltage, the capacitance vs. bias voltage response of the capacitive elements, the time constant of the circuit and the capacitance value.

The methodologies described above can be utilized alone or in combination with each other (including various combinations). In one or more embodiments, the methodologies described above can be used with passive networks where the sensing voltage is not directly across the capacitive element.

In one or more embodiments, the system and methodologies can decrease the charge and discharge time of variable capacitors or MEMS or other actuators, where the switching timing or switching frequency is directly related to the charge and discharge time of the intrinsic circuit capacitance or of the equivalent capacitance.

FIG. 1 depicts an illustrative embodiment of a portion of a communication device 100 that includes a bias unit and an RF capacitive device. In this embodiment, A1 is an operational amplifier, R1 and R2 are passive devices (e.g., resistors and/or inductors. C1 is a passive device, such as a capacitive element.

In one embodiment, the RC load could be a PTIC device (tunable capacitor). The PTIC device may be implemented using multiple tunable capacitors connected in series to distribute and divide the RF voltage. A bias network consisting of resistors can be used to bias each capacitor in the stack, resulting in a distributed RC load. An interior node in the string of series-connected capacitors can be used as the feedback to the operational amplifier. The node, which is used as the tap point for feedback, can be chosen to provide the best or desired compromise between charge time of the net capacitance of the device and loop stability.

Figure 2:
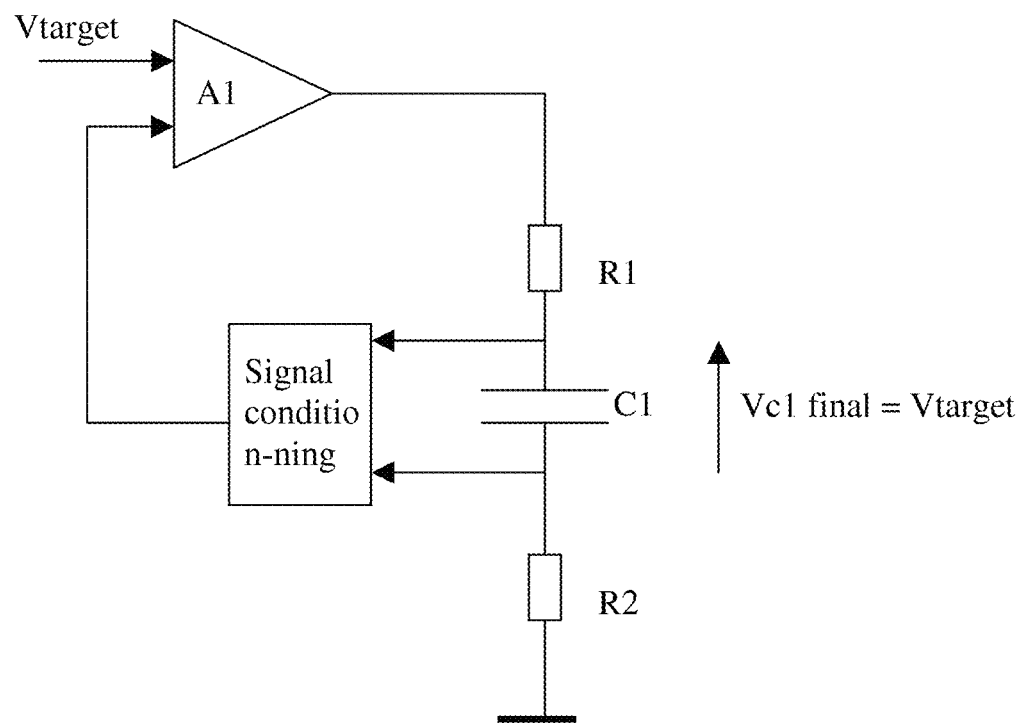
FIG. 2 depicts an illustrative embodiment of a feedback system that can be used with a communication device.
Figure 3:
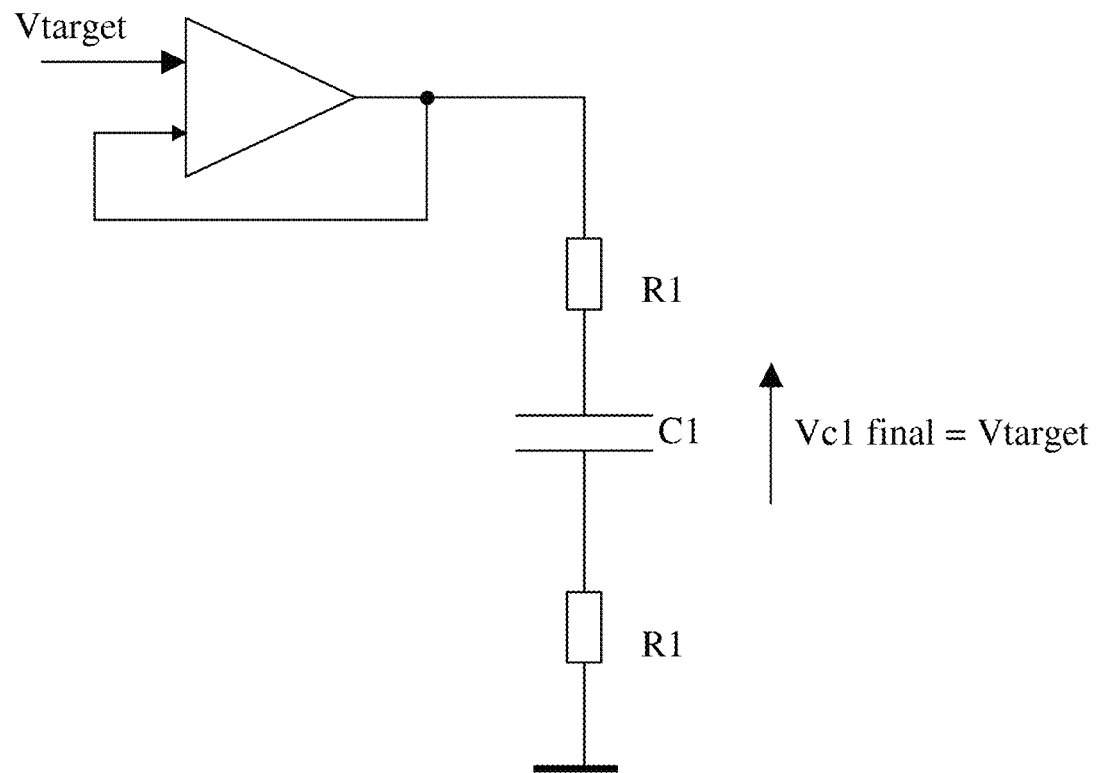
FIG. 3 depicts an illustrative embodiment of a contemporary operational amplifier with feedback.

Referring to FIG. 2, an illustrative embodiment of a feedback system 200 is illustrated that can be used with a communication device, such as in place of the mirror circuit of FIG. 1. The feedback system 200 can be compared with a contemporary operational amplifier with feedback shown in the system 300 of FIG. 3. The feedback voltage for system 200 is equal to the voltage across C1 and not the voltage across C1 and R1 and R2. In a traditional implementation, during the transient response of a charge (respectively discharge), the transient current flowing through the resistive elements increases (respectively decreases) the feedback voltage, making the voltage across C1 artificially higher (respectively lower), reducing the effect of the feedback loop, as shown in system 300. With the methodology of system 200, the real voltage across the capacitor is sensed (and not the artificial one), which forces the operation amplifier to keep its output voltage higher (respectively lower) longer, which speeds up the charge (respectively discharge) of the capacitor C1.

Figure 4:
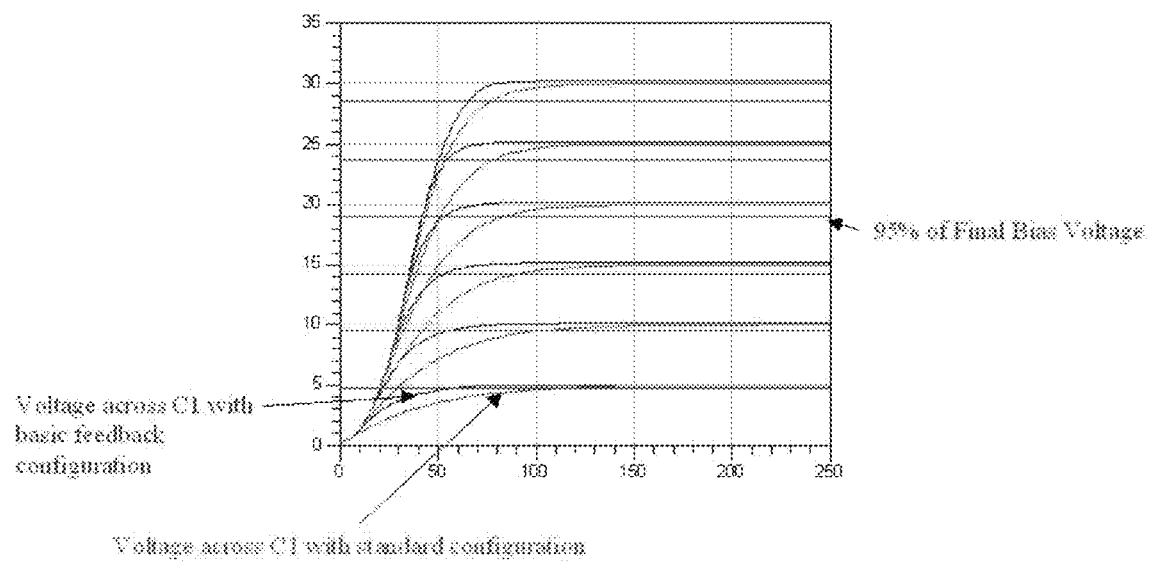
FIG. 4 depicts an exemplary graph depicting charge times associated with the components of FIGS. 1 and 2.
Figure 5:
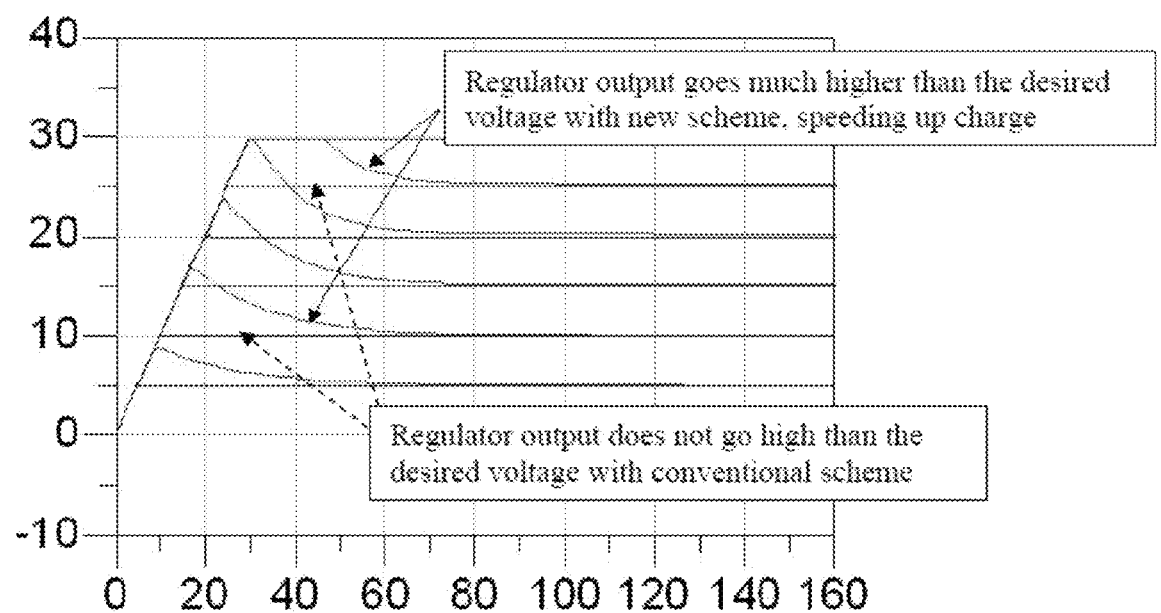
FIG. 5 depicts an exemplary graph depicting output voltage that compares the components of FIGS. 1 and 2 with the components of FIG. 3.

As shown in FIG. 4, there are shorter charge times with system 200 as compared to system 300. FIG. 5 depicts an exemplary graph depicting output voltages that compares the components of FIGS. 1 and 2 with the components of FIG. 3 and further shows that the system 200 can speed up the charge time. C1.

Figure 6:
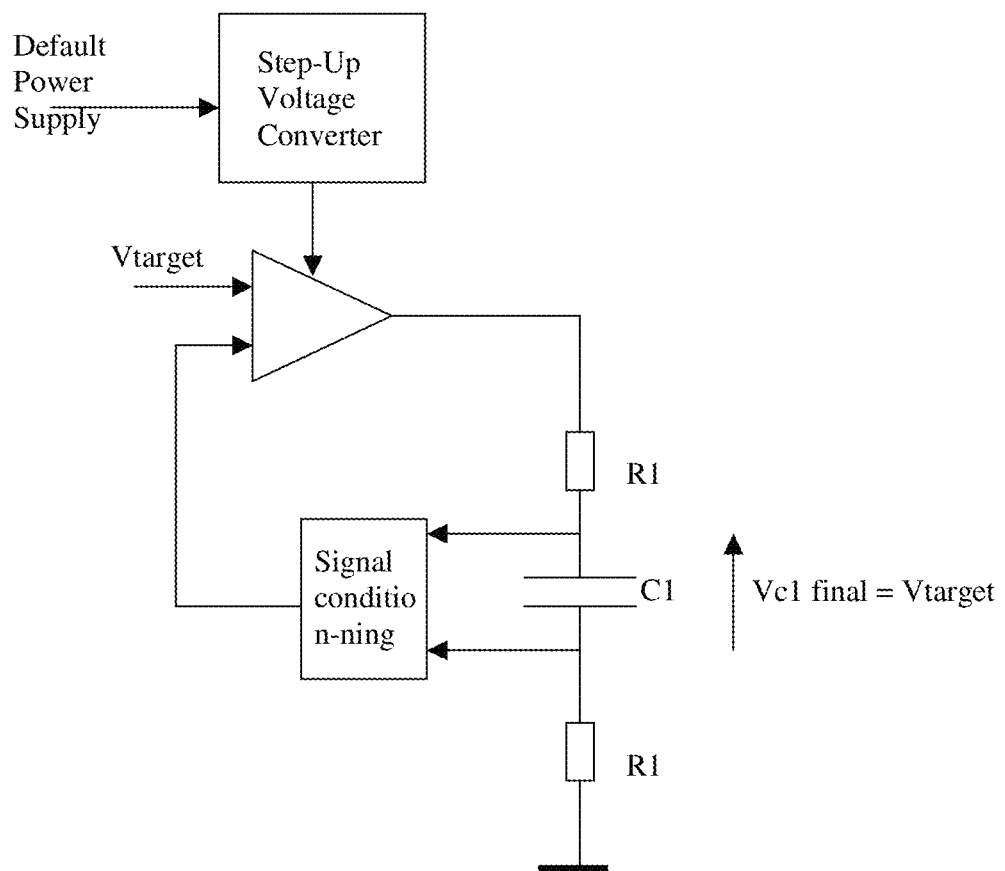
FIG. 6 depicts an illustrative embodiment of the feedback system of FIG. 2 along with a step-up voltage converter.
Figure 7:
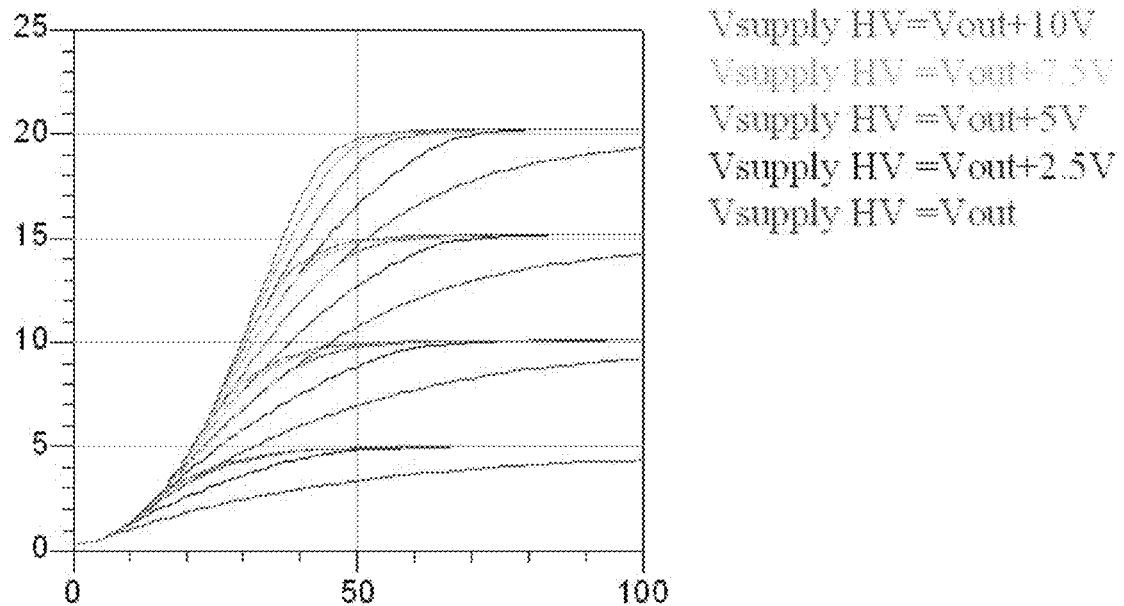
FIG. 7 depicts an exemplary graph depicting charge times associated with the components of FIG. 6.

FIG. 6 depicts an illustrative embodiment of the feedback system of FIG. 2 along with a step-up voltage converter that enables generating a higher voltage supply to speed up the charge of the capacitor C1. In this embodiment, the charge time is decreased if the output voltage of the amplifier can go above the desired voltage for the capacitor. Increasing the headroom for the regulator can provide improvement to device performance. FIG. 7 shows that using a higher voltage supply (from +2.5V to +10V here) speeds up the charge time of the capacitor.

Figure 8:
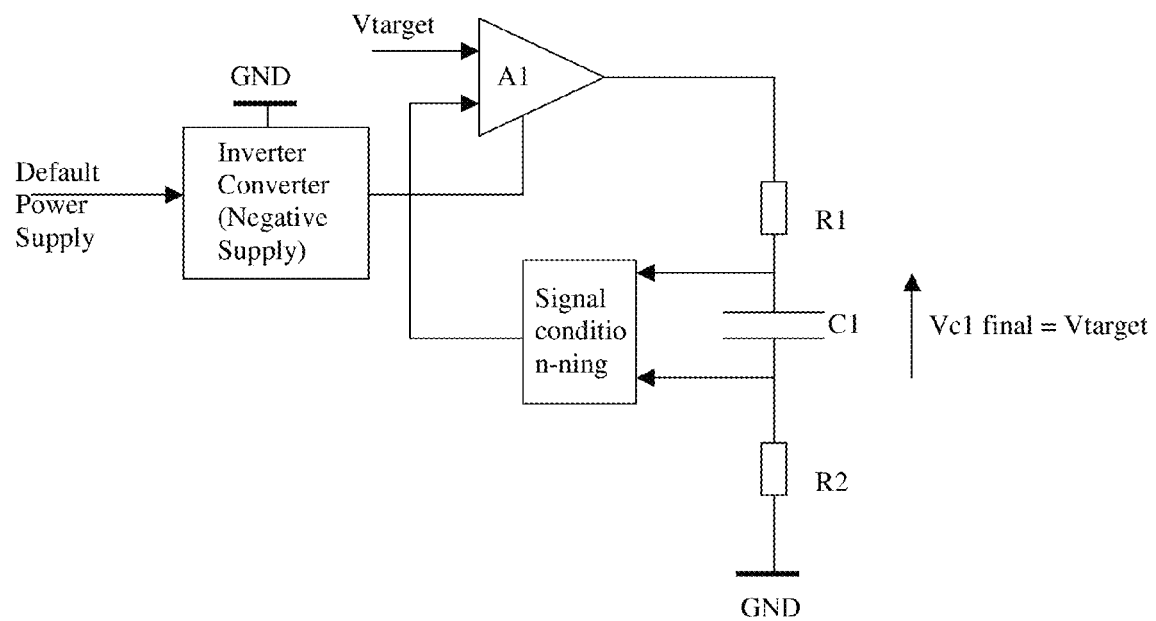
FIG. 8 depicts an illustrative embodiment of the feedback system of FIG. 2 along with an inverter voltage converter.

FIG. 8 depicts an illustrative embodiment of the feedback system of FIG. 2 along with an inverter voltage converter. In this embodiment, a negative supply voltage is generated to speed up discharge of the capacitor C1. An increase in the negative headroom enables the output voltage to go much lower.

Figure 9:
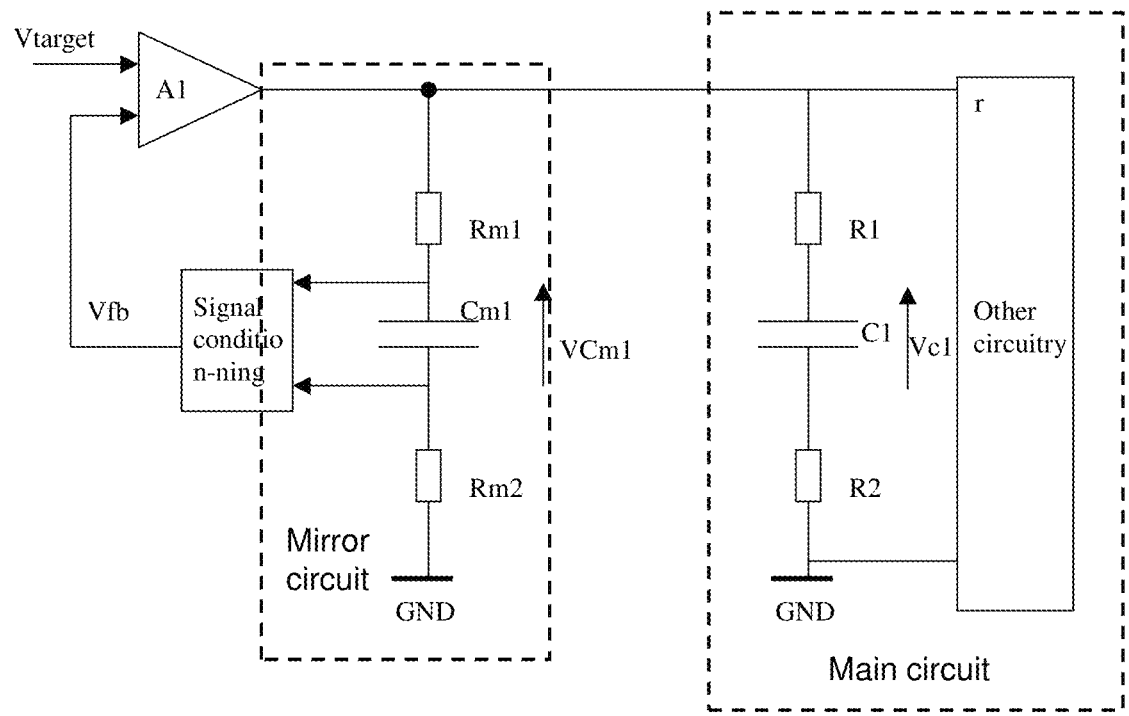
FIGS. 9 and 10 depict illustrative embodiments of a portion of a communication device that includes a mirror circuit to control the charge and discharge of a capacitive element and to sense voltage across the resistive and capacitive elements.
Figure 10:
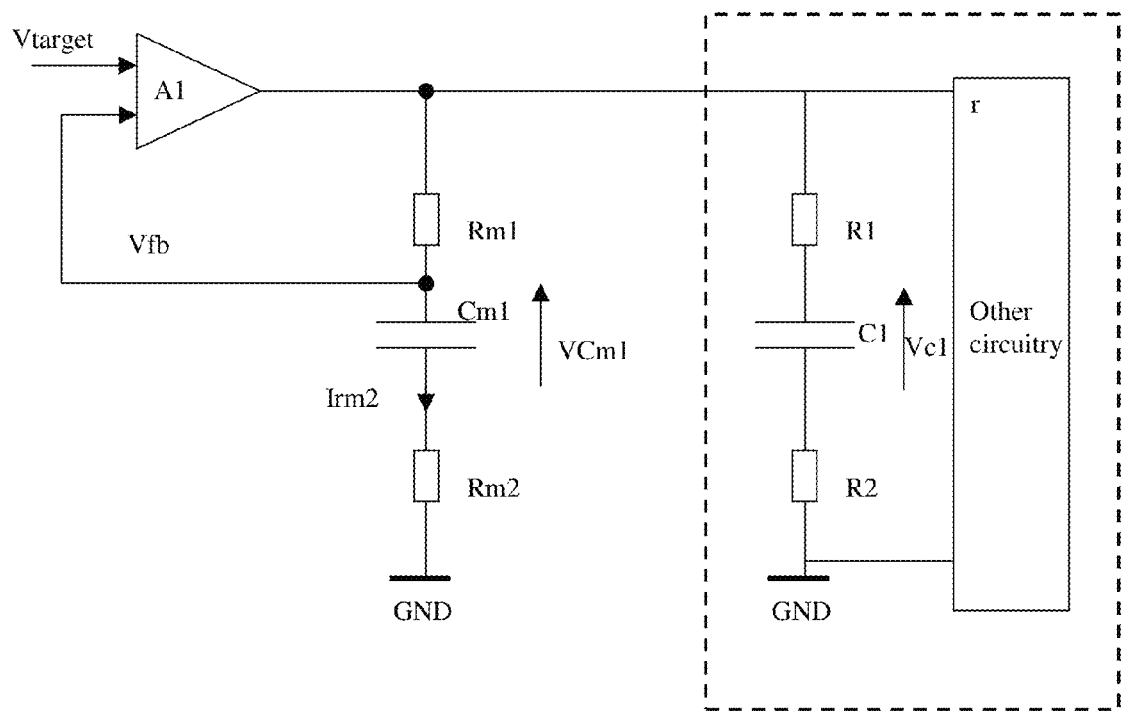

FIGS. 9 and 10 depict illustrative embodiments of a portion of communication devices 900, 1000 that include a mirror circuit to control the charge and discharge of a capacitive element and to sense voltage across the resistive and capacitive elements. The time and frequency response of the mirror circuit can be equal (or similar) to the time and frequency response of the main circuit, so that the voltage VCm1 across the mirror capacitor Cm1 is equal to the voltage Vc1 across the main capacitor C1. Scaling the capacitors and resistors values realizes the mirror circuit: $(Rm1+Rm2) \times Cm1 = (R1+R2) \times Cm2$. The mirror circuit provides that the feedback circuit does not interfere with the main circuit, avoiding parasitic, coupling, performance degradation. The mirror circuit can also be more remote, making the sensing and/or feedback easier to implement. On integrated technology, the mirror will be made of a device having the same characteristics as the main circuit, compensating for temperature, voltage or process variations. In one embodiment, the feedback voltage is not differential but is a hybrid between a conventional implementation and the exemplary embodiment. Nonetheless, the choice of Rm1 and Rm2 can be made in such a way that most or all of the benefits of the configuration of FIG. 9 are realized. The mirror circuit can be with or without a voltage tunable dielectric capacitor.

Figure 11:
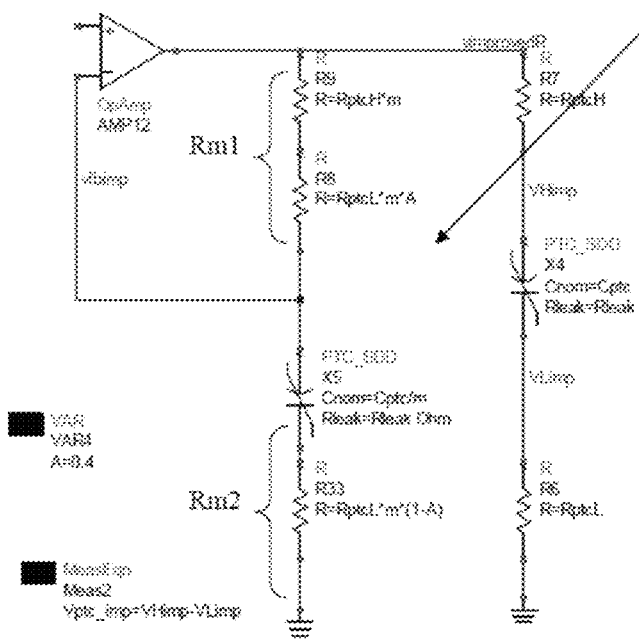
FIG. 11 depicts an illustrative embodiment of a portion of a communication device that includes another mirror circuit to increase the charge and discharge of a main capacitive element.
Figure 12:
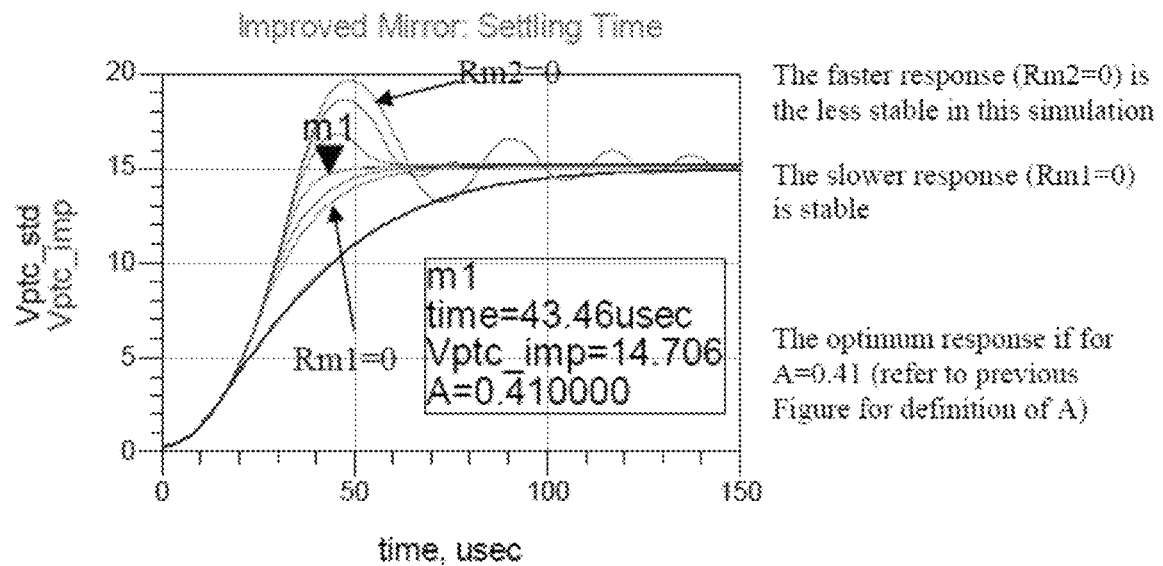
FIG. 12 depicts an exemplary graph depicting charge times associated with the components of FIG. 11.

FIG. 11 depicts an illustrative embodiment of a portion of a communication device that includes another mirror circuit to increase the charge and discharge of a main capacitive element. By reducing Rm2 and increasing Rm1 (Rm1+Rm2=constant), the time constant of the mirror can remain the same but the sensed voltage becomes equal or gets closer to the voltage across Cm1, increasing the charge and discharge time of the capacitors Cm1 and C1. FIG. 12 depicts an exemplary graph depicting charge times associated with the components of FIG. 11. The repartition of Rm1 and Rm2 can also be dictated by other factors such as stability issue of the loop.

Referring back to FIGS. 1 and 2, the RF capacitive device is left undisturbed by the control feedback. In order to speed up the charge using a conventional closed loop, the voltage Vref setting the desired voltage can be temporarily increased, leading to a higher output voltage for the amplifier, which in turns accelerate the charge rate of the capacitor C1. The core principle is that the charge time of a R–C network is independent of the final voltage but only dependant of the time constant R×C. By applying a higher voltage for the charge, the slope of the rising voltage will be higher in order to reach its higher final value in a time approximately equal to 3 R×C (95% of Vfinal). This can be used to charge faster initially and then change the target voltage back to its desired value, ideally when the output voltage has exactly reached the desired voltage. This technique can nonetheless be combined with the other exemplary embodiments using the optimized feedback control.

Figure 13:
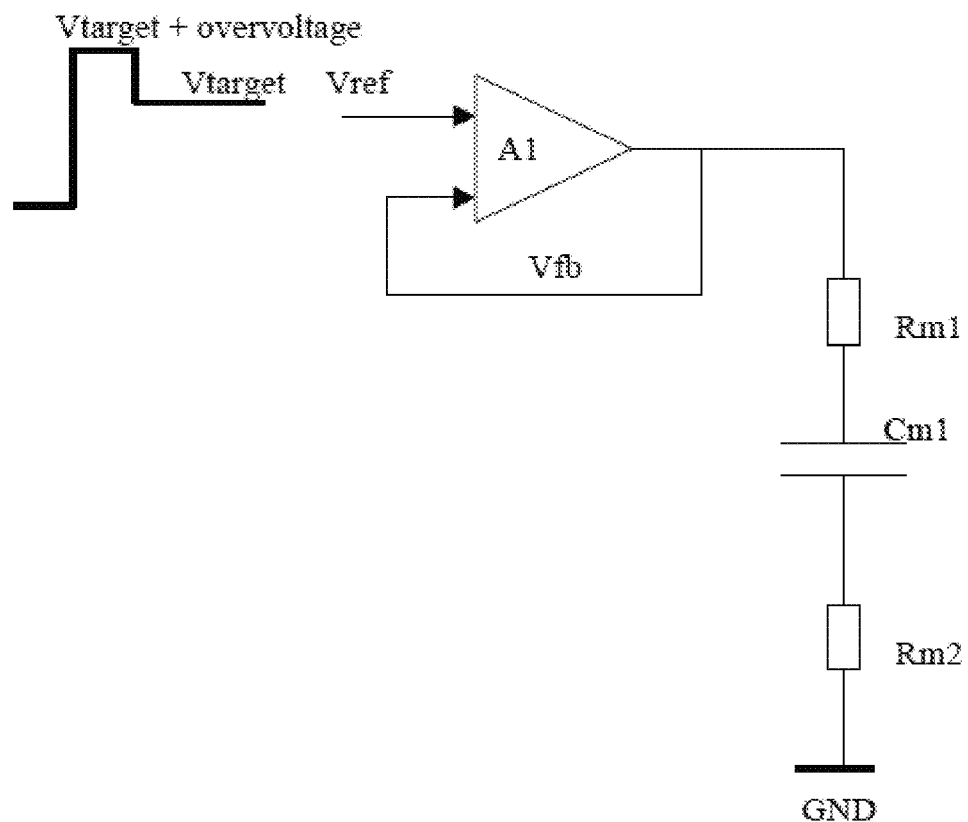
FIGS. 13 and 14 depict an exemplary graph and components depicting an overvoltage applied at an input of a regulator.
Figure 14:
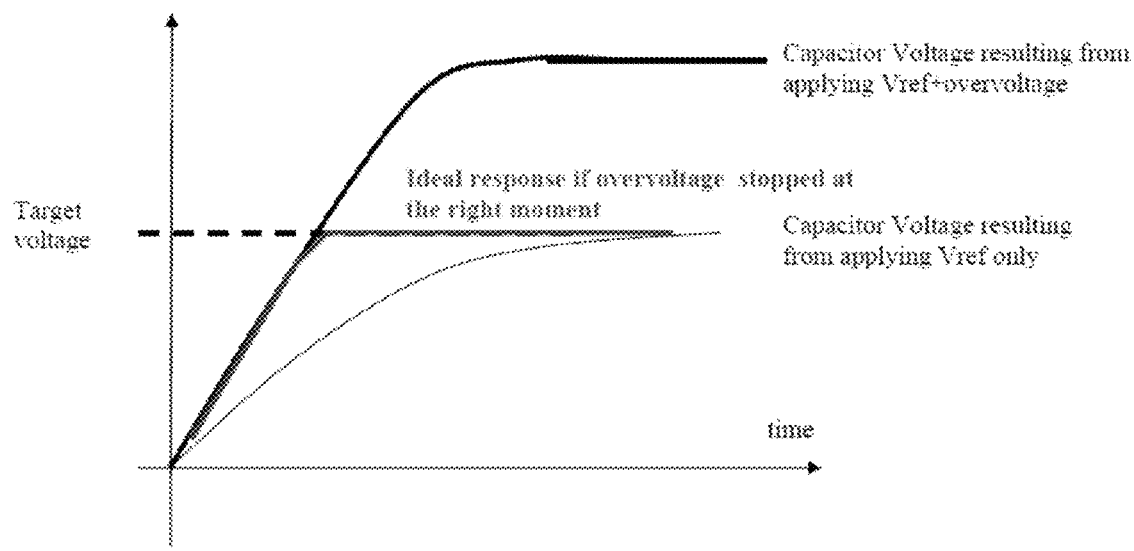
Figure 15:
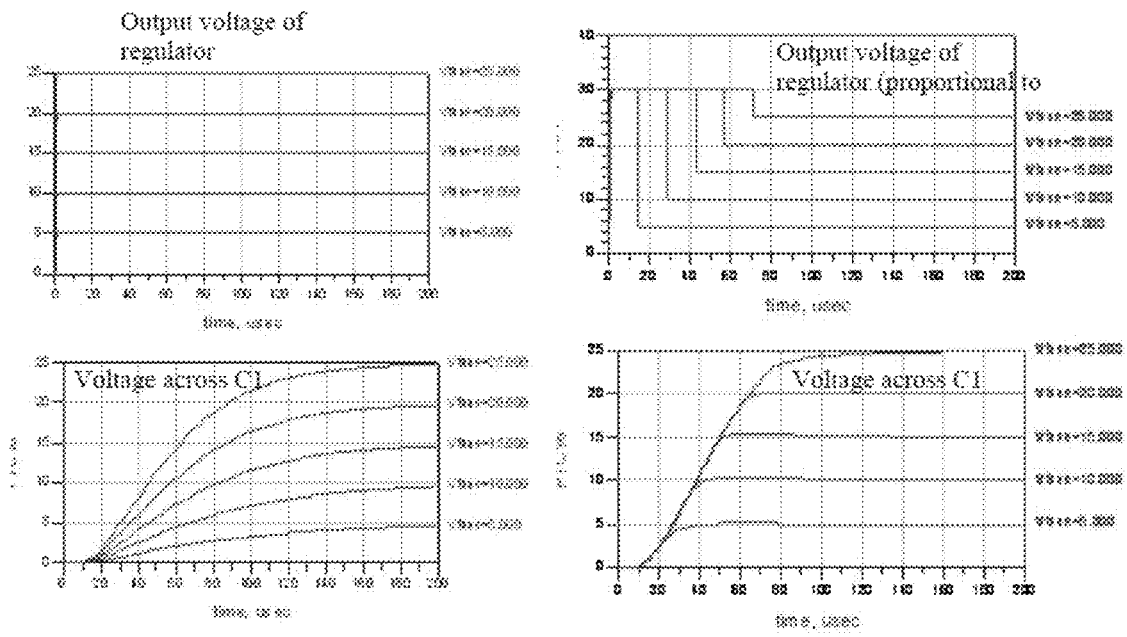
FIG. 15 illustrates a simulation of a conventional loop on the left and a simulation of a conventional loop on the right with application of an overvoltage proportional to the desired output voltage controlled by Vref. whereby the charge time with overvoltage applied on Vref is much shorter.

FIGS. 13 and 14 depict an exemplary graph and components depicting an overvoltage applied at an input of a regulator. FIG. 15 illustrates a simulation of a conventional loop on the left and a simulation of a conventional loop on the right with application of an overvoltage proportional to the desired output voltage controlled by Vref. whereby the charge time with overvoltage applied on Vref is much shorter. In one embodiment this can be implemented using a DAC such as through holding the DAC higher so that the overvoltage is being applied which results in the reduction in charge/discharge time.

One or more of the exemplary embodiments, provide sensing nodes directly across the capacitive device as an input of an operational amplifier or regulator. One or more of the exemplary embodiments, use or generate a higher positive supply and/or lower negative supply. One or more of the exemplary embodiments, use a mirror device for sensing voltage so that the feedback circuit does not interfere with the main circuit, avoiding parasitic, coupling, performance degradation. One or more of the exemplary embodiments can use an overvoltage voltage at the input of the regulator.

One or more of the exemplary embodiments can measure the real voltage across the capacitive element or a voltage closer to the real value than with the conventional solution measuring across the total R and C. This inherently improves the charge time. One or more of the exemplary embodiments allow biasing the network at more positive (or more negative) voltages, allowing driving more current into (out of) the passive network, which reduces the charge (discharge) time of the capacitor. One or more of the exemplary embodiments allow sensing the voltage across a capacitive element without actually tapping the useful device. Therefore, points A and B can be used and the main capacitive element can maintain its performance level (e.g., RF performance). One or more of the exemplary embodiments can temporarily force the capacitor to charge (discharge) to a higher (lower) voltage.

In one or more embodiments, the resistive elements (R1, R2, Rm1 . . . ) can be any passive or active device, or any combination of them. In one or more embodiments, the capacitor can be a varactor, a variable capacitor, an actuator, a MEMS, a pin diode, a tunnel diode, a standard diode, and so forth. In one or more embodiments, the amplifier can be any kind of regulating device. In one or more embodiments, the DC/DC converter can be replaced by any power supply.

While the exemplary embodiments are described with respect to impedance tuning utilizing closed loop or open loop systems, it should be understood that one or more components and/or methodologies described with respect to the exemplary embodiments can be used in other system, such as for driving MEMS (switches) and/or driving piezo elements or any kind of actuators.

The exemplary embodiments, portions thereof, or combinations thereof can be used in combination with one or more components and/or one or more techniques described with respect to other impedance tuning such as the closed-loop iterative methods explained in U.S. Pat. No. 8,217,732 to McKinzie, the disclosure of which is hereby incorporated by reference. Other references that describe components and/or techniques that can be used in combination with one or more components and/or techniques of the exemplary embodiments include U.S. Pat. No. 7,991,363 to Greene, U.S. Pat. No. 7,917,104 to Manssen, U.S. Pat. No. 6,590,468 to duToit, U.S. Pat. No. 7,714,676 to McKinzie, and U.S. Patent Publication 20120112852 to Manssen, the disclosures of all of which are hereby incorporated by reference.

In one or more embodiments, a context of the device can be determined, such as use cases that effect the impedance including a flip open state, a slider out state, a hand's free operation state, a hand-held operation state, an ear-piece speaker operation state, a speaker-phone operation state, and so forth. The use case can be determined or otherwise identified based on a number of processes, such as mechanical sensors, user input, calculated based on changes to operational metrics, and so forth.

In one or more embodiments, a matching circuit can be utilized that is of various configurations and can include various components, including voltage tunable dielectric capacitors, Micro-Electro-Mechanical Systems (MEMS) varactors, semiconductor varactors, MEMS switched reactance component, semiconductor switched reactance component, or combinations thereof. The matching circuit can include fixed and/or variable reactance elements. As an example, a pi network can be used to perform impedance matching. Varying the reactance of capacitors C1, C2 and inductor L enables matching a wide range of complex impedances between the RF source (SRC) and load.

The communication device of the exemplary embodiments can comprise one or more transceivers coupled to one or more antennas, a tunable circuit, one or more tuning sensors, a user interface (UI), a power supply, a location receiver, a motion sensor, an orientation sensor, and a controller for managing operations thereof. The transceiver can support short-range and/or long-range wireless access technologies such as Bluetooth, ZigBee, Wireless Fidelity (WiFi), Digital Enhance Cordless Telecommunications (DECT), or cellular communication technologies, just to mention a few. Cellular technologies can include, for example, Global System for Mobile (GSM), Code Division Multiple Access (CDMA), Time Division Multiple Access (TDMA), Universal Mobile Telecommunications (UMTS), World interoperability for Microwave (WiMAX), Software Defined Radio (SDR), Long Term Evolution (LTE), as well as other next generation wireless communication technologies as they arise. The transceiver can also be adapted to support circuit-switched wireline access technologies such as Public Switched Telephone Network (PSTN), packet-switched wireline access technologies such as TCP/IP, Voice over IP—VoIP, etc., or combinations thereof.

In one or more embodiments, the tunable circuit can comprise any number of variable reactive elements such as variable capacitors, variable inductors, or combinations thereof that are tunable with digital and/or analog bias signals. The tunable circuit can include other reactive elements, such as fixed reactive elements, including capacitors and inductors. The tunable circuit can represent a tunable matching network coupled to the antenna to compensate for a change in impedance of the antenna, a compensation circuit to compensate for mutual coupling in a multi-antenna system, an amplifier tuning circuit to control operations of an amplifier of the transceiver, a filter tuning circuit to alter a pass band of a filter used by the transceiver, and so on.

In one or more embodiments, the tuning sensors can be placed at any stage of the transceiver such as, for example, before or after a matching network, and/or at a power amplifier. The tuning sensors can utilize any suitable sensing technology such as directional couplers, voltage dividers, or other sensing technologies to measure signals at any stage of the transceiver. The digital samples of the measured signals can be provided to the controller by way of analog-to-digital converters included in the tuning sensors. Data provided to the controller by the tuning sensors can be used to measure, for example, transmit power, transmitter efficiency, receiver sensitivity, power consumption of the communication device, frequency band selectivity by adjusting filter passbands, linearity and efficiency of power amplifiers, specific absorption rate (SAR) requirements, and so on. The particular type of tuning sensors and their configuration in the communication device can depend on the parameters that are being gathered, such as utilizing a directional coupler positioned between the matching network and the antenna where forward and reverse power is to be sampled and monitored. The controller can be configured to execute one or more tuning algorithms to determine desired tuning states of the tunable circuit based on the foregoing measurements.

The exemplary embodiments can include a machine in the form of a computer system within which a set of instructions, when executed, may cause the machine to perform any one or more of the methods discussed above. One or more instances of the machine can operate, for example, as the communication device 100.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video and/or data communication. Further, while a single machine is illustrated, the term "machine" shall also be taken to include any collection of machines that individually or jointly execute a set (or multiple sets) of instructions to perform any one or more of the methods discussed herein.

The computer system may include a processor (or controller) (e.g., a central processing unit (CPU), a graphics processing unit (GPU, or both), a main memory and a static memory, which communicate with each other via a bus. The computer system may further include a display unit (e.g., a liquid crystal display (LCD), a flat panel, or a solid state display. The computer system may include an input device (e.g., a keyboard), a cursor control device (e.g., a mouse), a disk drive unit, a signal generation device (e.g., a speaker or remote control) and a network interface device. In distributed environments, the embodiments described in the subject disclosure can be adapted to utilize multiple display units controlled by two or more computer systems. In this configuration, presentations described by the subject disclosure may in part be shown in a first of the display units, while the remaining portion is presented in a second of the display units.

The disk drive unit may include a tangible computer-readable storage medium on which is stored one or more sets of instructions (e.g., software) embodying any one or more of the methods or functions described herein, including those methods illustrated above. The instructions may also reside, completely or at least partially, within the main memory, the static memory, and/or within the processor during execution thereof by the computer system. The main memory and the processor also may constitute tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 2300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure, including utilizing one or more features from one embodiment in place of or in addition to one or more features of another embodiment(s). One or more of the exemplary embodiments included in the specification and/or recited in whole or in part in the claims describe functions, steps, determinations, calculations and/or other actions being "based on" one or more factors or other criteria, such as a categorized history of previous tuning search paths being generated based on monitoring previous tuning search paths during previous tuning and based on monitoring previous usage modes during the previous tuning, or such as the adjusting of the tuning search path for the tuning of the matching network being based on the categorized history of previous tuning search paths and the usage mode. It should be understood by one of ordinary skill in the art that the term "based on" can be an open-ended term such that one or more other factors may or may not also be a basis for the function, step, determination, calculation and/or other action in addition to the specifically described factor or criteria.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
    an antenna;
    a transceiver coupled with the antenna;
    an RF capacitive device coupled with the antenna and the transceiver, wherein the RF capacitive device comprises:
        a device capacitor;
        a first resistive device coupled between a biasing node and one end of the device capacitor; and
        a second resistive device coupled between another end of the device capacitor and electrical ground; and
    an operational amplifier coupled with the RF capacitive device by way of the biasing node, wherein the RF capacitive device operates according to a first time constant; and
    a mirror circuit comprising a capacitive portion, wherein the capacitive portion comprises:
        a mirror capacitor;
        a first mirror resistive device coupled between the biasing node and one end of the mirror capacitor; and
        a second mirror resistive device coupled between another end of the mirror capacitor and electrical ground, wherein the capacitive portion operates according to a second time constant, wherein the mirror circuit emulates a time and frequency response of the RF capacitive device, wherein the second time constant is based on the first time constant, and wherein feedback signals from the mirror circuit are provided to an input of the operational amplifier via a feedback node coupled with the mirror circuit.

2. The communication device of claim 1, wherein the feedback signals are based on measurements directly across the mirror capacitor.

3. The communication device of claim 1, wherein the capacitive portion of the mirror circuit includes a fixed capacitor without a voltage tunable dielectric capacitor.

4. The communication device of claim 1, wherein the capacitive portion of the mirror circuit includes a voltage tunable dielectric capacitor.

5. The communication device of claim 1, wherein the RF capacitive device includes a voltage tunable dielectric capacitor.

6. The communication device of claim 1, wherein the mirror capacitor is adjustable based on a predetermined final voltage.

7. The communication device of claim 1, wherein the mirror circuit is adjustable based on a capacitance vs. bias voltage response of the mirror capacitor.

8. The communication device of claim 1, wherein the mirror circuit is adjustable based on one of the first time constant or the second time constant.

9. The communication device of claim 1, wherein a first product of the first mirror resistive device and the mirror capacitor is greater than a second product of the first resistive device and the device capacitor.

10. The communication device of claim 1, comprising a step-up DC/DC voltage converter coupled with the operational amplifier that generates an increased positive voltage supply from a default power supply and provides the increased positive voltage supply to the operational amplifier.

11. The communication device of claim 1, comprising an inverter DC/DC voltage converter coupled with the operational amplifier that generates a decreased negative voltage supply from a default power supply and provides the decreased negative voltage supply to the operational amplifier.

12. The communication device of claim 1, wherein the RF capacitive device is utilized in an open loop control system for performing impedance matching.

13. The communication device of claim 12, wherein the open loop control system performs impedance tuning based in part on a use case of the communication device.

14. The communication device of claim 1, further comprising a matching network, wherein the RF capacitive device is part of the matching network and is utilized in a closed loop control system for performing impedance matching.

15. An apparatus, comprising:
a matching network comprising a first capacitive circuit in electrical communication with a biasing node, wherein the matching network provides impedance matching during RF communications, wherein the first capacitive circuit operates according to a first time constant;
an operational amplifier in electrical communication with the biasing node;
a mirror circuit comprising second capacitive circuit in electrical communication with the biasing node, wherein the mirror circuit emulates an RF behavior associated with at least a portion of the matching network, including emulating a time and frequency response of the at least a portion of the matching network;
a memory that stores executable instructions; and
a controller; and
a memory that stores executable instructions that, when executed by the controller, facilitate performance of operations, comprising:
 determining a driving voltage to be applied to the second capacitive circuit to achieve a predetermined operational result associated with the RF communications, wherein the second capacitive circuit operates according to a second time constant that is based on the first time constant; and
 applying a first bias voltage to the second capacitive circuit, wherein the first bias voltage is higher than the driving voltage for a first duration to reduce a charge time, wherein the first duration is determined based on a capacitance vs. bias voltage response of the second capacitive circuit, the second time constant and a capacitance value of the second capacitive circuit.

16. The apparatus of claim 15, wherein the mirror circuit operates according to a second time constant based on the first time constant, wherein feedback signals from the mirror circuit are provided to an input of the operational amplifier via a feedback node coupled with the mirror circuit.

17. The apparatus of claim 16, wherein the matching network performs an open loop impedance matching process utilizing the first capacitive circuit.

18. The apparatus of claim 16, wherein the matching network performs a closed loop impedance matching process utilizing the first capacitive circuit.

19. A communication device, comprising:
an antenna;
a transceiver coupled with the antenna;
an impedance matching circuit coupled between the antenna and the transceiver, wherein the impedance matching circuit comprises a first RC circuit operating according to a first time constant;
an operational amplifier coupled with the impedance matching circuit; and
a second RC circuit coupled with the operational amplifier and the impedance matching circuit, wherein the second RC circuit includes a serial connection of resistive elements with a capacitive element positioned between the resistive elements to cause the second RC circuit to operate according to a second time constant that is based on the first time constant, wherein the second RC circuit emulates a time and frequency response of the first RC circuit, and wherein feedback signals for the operational amplifier are measured directly across the capacitive element to facilitate tuning of the impedance matching circuit.

20. The communication device of claim 19, wherein the capacitive element includes a voltage tunable dielectric capacitor.

* * * * *